United States Patent
Weiss et al.

(10) Patent No.: US 6,230,924 B1
(45) Date of Patent: May 15, 2001

(54) CLOSURE INDICATOR FOR CUP LID

(75) Inventors: David Weiss; Ronald I. Kall, both of Plantation, FL (US)

(73) Assignee: Design Safety Corporation, Plantation, FL (US)

( * ) Notice: Subject to any disclaimer, the term of this patent is extended or adjusted under 35 U.S.C. 154(b) by 0 days.

(21) Appl. No.: 09/337,033

(22) Filed: Jun. 28, 1999

(51) Int. Cl.$^7$ .................................................. B65D 51/00
(52) U.S. Cl. ...................... 220/713; 220/366.1; 229/404
(58) Field of Search .................... 220/711–715, 366.1, 220/780, 781, 792, 796, 799, 800–802, 784–786; 229/404, 906.1, 406; 215/320, 274, 275, 325

(56) References Cited

U.S. PATENT DOCUMENTS

| | | | |
|---|---|---|---|
| 2,263,947 | * 11/1941 | Gottfried | 220/710 |
| 3,347,409 | * 10/1967 | Burns . | |
| 3,411,660 | * 11/1968 | Lafarge . | |
| 3,532,244 | * 10/1970 | Yates, Jr. . | |
| 3,773,207 | * 11/1973 | Dokoupil et al. | 220/270 |
| 3,858,756 | * 1/1975 | Fulton | 220/374 |
| 3,868,043 | 2/1975 | Freemyer . | |
| 4,186,786 | 2/1980 | Kirkpatrick . | |
| 4,285,105 | 8/1981 | Kirkpatrick . | |
| 4,361,249 | 11/1982 | Tuneski et al. . | |
| 4,437,576 | * 3/1984 | Barniak | 220/710 |
| 4,441,623 | * 4/1984 | Antoniak | 220/711 |
| 4,502,608 | * 3/1985 | Mills | 220/712 |
| 4,629,088 | * 12/1986 | Durgin | 220/254 |
| 4,705,188 | * 11/1987 | Rahn | 220/366.1 |
| 4,767,019 | 8/1988 | Horner . | |
| 4,829,641 | 5/1989 | Williams . | |
| 4,898,298 | * 2/1990 | Norris | 220/711 |
| 4,905,861 | * 3/1990 | Boxall et al. | 220/266 |
| 4,907,321 | 3/1990 | Williams . | |
| 4,986,429 | 1/1991 | Singleton, Jr. . | |
| 5,076,425 | * 12/1991 | Plone | 206/220 |

(List continued on next page.)

FOREIGN PATENT DOCUMENTS

| | | | | |
|---|---|---|---|---|
| 1113594 | * 10/1966 | (NL) | | 215/320 |
| 77716 | * 11/1950 | (NO) | | 220/666 |

OTHER PUBLICATIONS

Fall/Holiday 1998 Tupperware catalog, pp. 4, 9, and 17, Dec. 1998.*

*Primary Examiner*—Allan N. Shoap
*Assistant Examiner*—Joe Merek
(74) *Attorney, Agent, or Firm*—Nixon Peabody LLP; Donald R. Studebaker

(57) ABSTRACT

A lid for a container including a closure surface, a circumferential rim extending about a periphery of the closure surface with the rim including an outer side wall, an inner side wall and a transition wall interconnecting the outer side wall and the inner side wall with the closure surface extending from the inner side wall and at least one cut out formed in at least one of the inner side wall, the outer side wall and the transition wall such that a portion of a brim of the container is visible through the cut out when the lid is properly positioned on the container. Alternatively, a lid and container combination including a container having a bottom wall and an upstanding side wall extending from the bottom wall, the upstanding side wall including a brim extending about an upper periphery of the side wall with at least a portion of said brim having a first color pigment and a lid formed of at least one of a transparent and translucent material, the lid including a closure surface and a rim extending about a periphery of the closure surface for engaging the brim of the container, at least a portion of the rim of the lid having a second color pigment such that when the lid and container are combined by inserting the brim of the container into the rim of the lid, the first color pigment of the container and the second color pigment of the lid combine to form a third color pigment visible from an outer surface of the rim.

15 Claims, 3 Drawing Sheets

U.S. PATENT DOCUMENTS

| | | |
|---|---|---|
| 5,115,929 | 5/1992 | Buono . |
| 5,138,750 | 8/1992 | Gundlach et al. . |
| 5,197,616 | 3/1993 | Buono . |
| 5,427,266 | 6/1995 | Yun . |
| 5,520,301 * | 5/1996 | Sohn .................................... 220/265 |
| 5,538,154 * | 7/1996 | Holdt .................................... 220/277 |
| 5,839,581 * | 11/1998 | Vagedes ............................ 206/459.1 |
| 5,839,592 | 11/1998 | Hayes . |
| 5,842,486 | 12/1998 | Davis et al. . |

\* cited by examiner

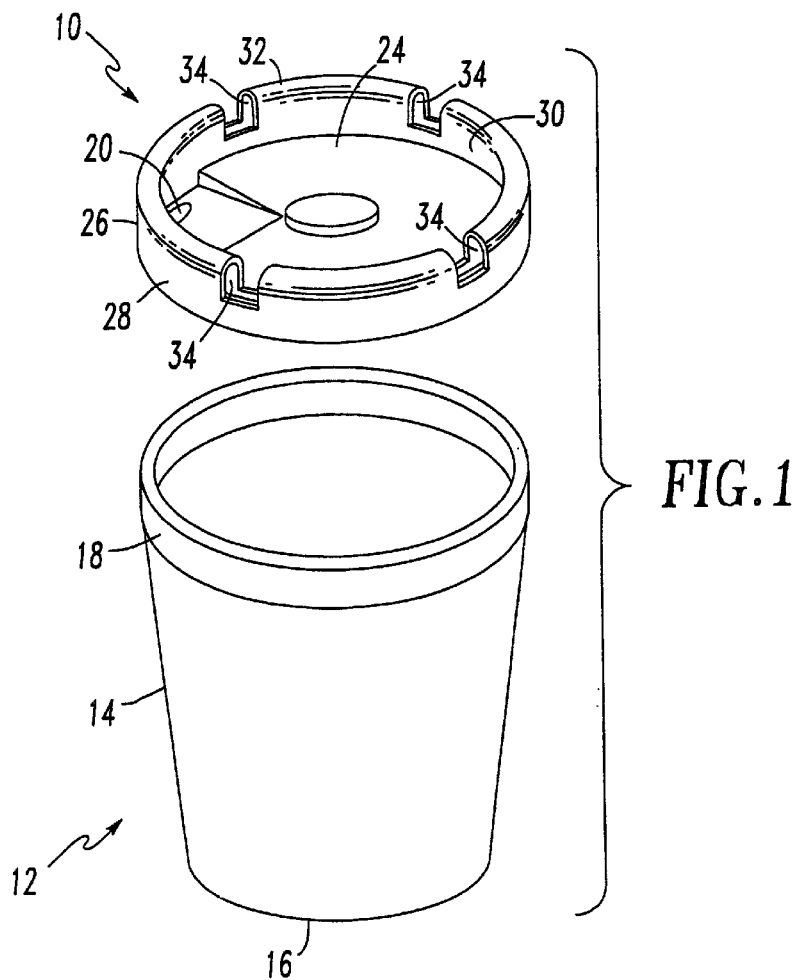
FIG.1
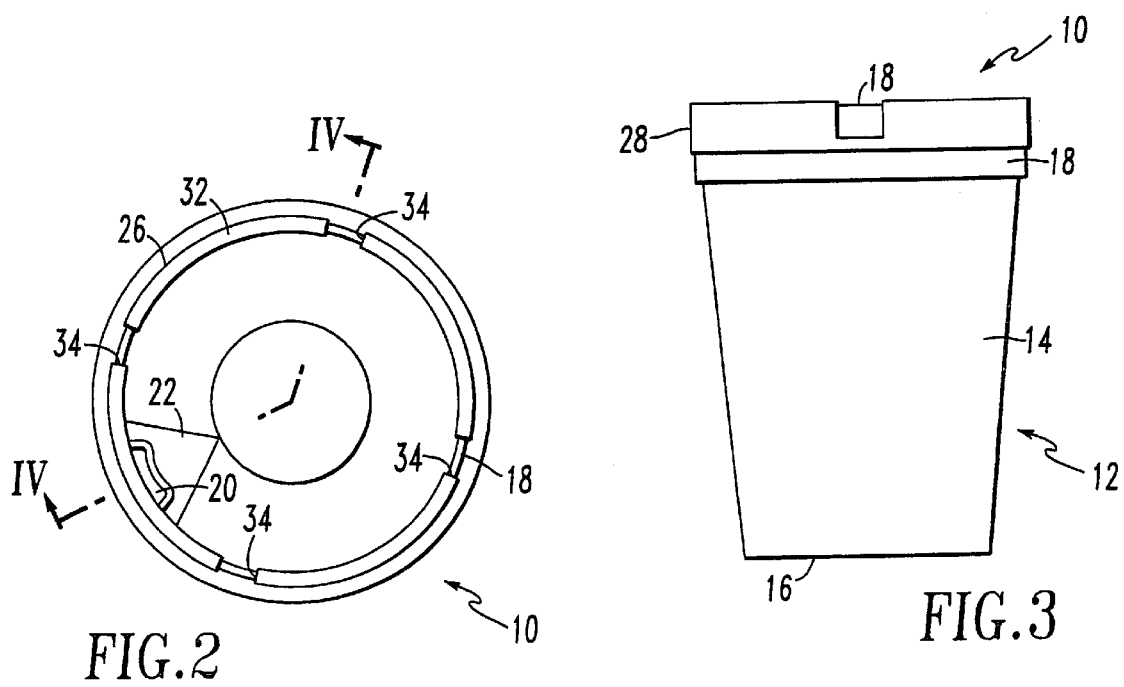
FIG.2
FIG.3

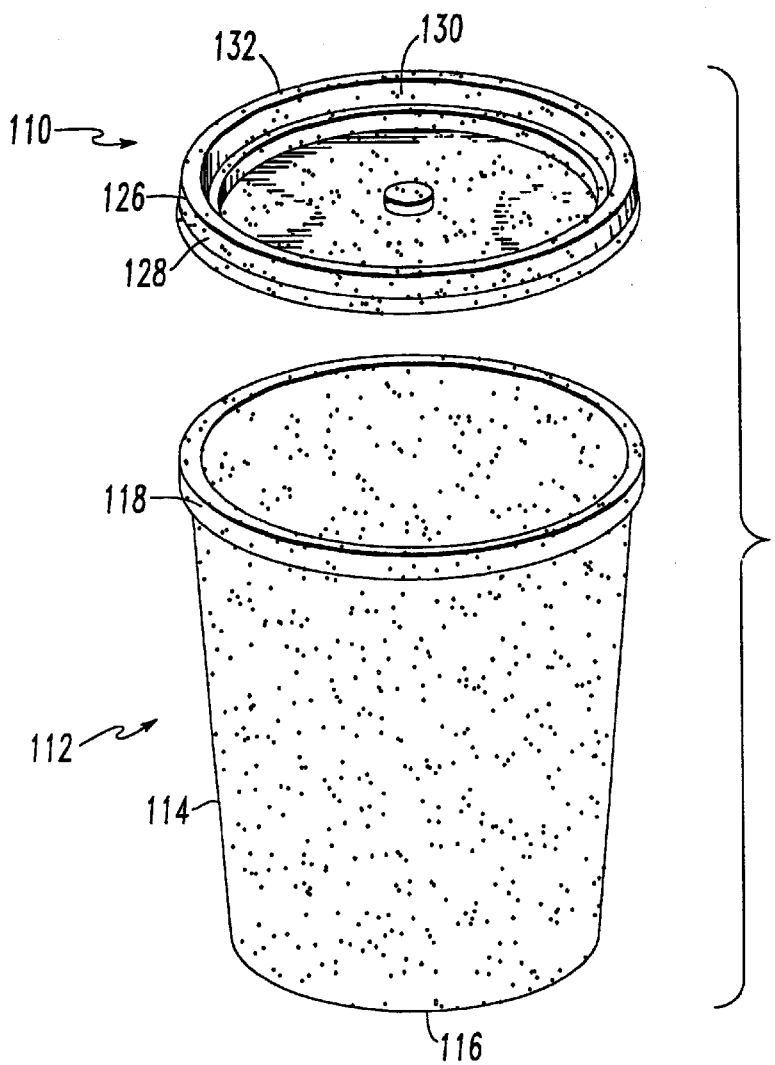
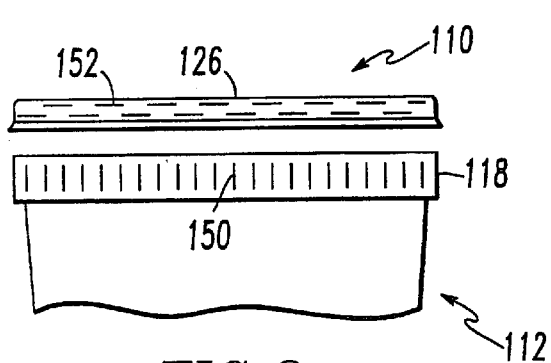
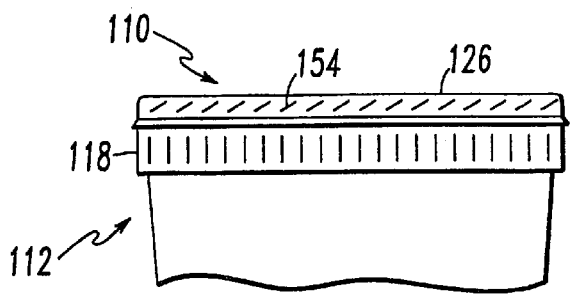
FIG. 7
FIG. 8
FIG. 9

CLOSURE INDICATOR FOR CUP LID

FIELD OF THE INVENTION

The present invention is directed to a lid for a container wherein the consumer can readily observe whether the lid is properly positioned over an opening in the container. More particularly, the present invention is directed to a disposable lid for a drinking cup including a closure indication mechanism for indicating to the consumer that the lid has been properly positioned over the opening in the container to properly seal the contents therein.

BACKGROUND OF THE INVENTION

Presently, numerous configurations exist in the prior art for sealing an opening of a container. Particularly, numerous designs for disposable lids for drinking containers are set forth throughout the prior art. In such prior art it has been readily acknowledged that there is a need to have disposable lids which resist splashing and spilling of the contents within the container.

Particularly, with the proliferation of fast food restaurants and extensive public and private transportation such as airplane and automotive travel, there is a recognized need for containers which readily transport portable beverages in a single serving size and which are disposable and spill resistant. Spills and splashes caused by beverages sloshing as resulting from the normal jostling associated with drinking beverages being transported are of a particular annoyance and pose a potential for serious injury. Moreover, with pressure being applied to the sides of the container, a container lid may become dislodged resulting in spillage of the contents on an unsuspecting consumer.

Problems associated with cup lids for hot beverages are often distinct from those associated with cold beverages. That is, should a cold beverage spill on a consumer, it is merely an annoying inconvenience. However, should a hot beverage spill on a consumer serious injury such as burns associated with the hot liquid or accidents due to the diversion of the consumers attention can occur. Moreover, fast food restaurants and similar establishments which utilize such disposable containers and lids have been found to be liable for substantial damages due to injuries to the consumer. Often times, the lids are not properly positioned on the container thus subjecting an unknowing consumer to risk of the beverage spilling from the container. Otherwise, the lid becomes dislodged due to pressure being applied to the sidewalls by the consumer.

In an initial effort to provide a disposable container and lid wherein the lid restrains spilling of the containers from the container by the consumer, U.S. Pat. No. 3,868,043 issued to Freemyer sets forth a lid adapted to be snapped over a disposable cup filled with a hot beverage having a perforated drinking section along one edge. The top of the lid slops toward the drinking sections so that any liquid spilled or poured on the lid flows back into the cup. While this lid configuration acknowledges the need to restrain the contents of the container within the container and return any contents to the container which may spill from the container, this lid construction clearly fails to indicate to the consumer as to whether or not the lid is properly positioned on the container to prevent spillage of the contents from between the container and the lid. Clearly, with this lid construction, should the lid become partially dislodged from the container, contents of the container can readily spill out from between the lid and container thus injuring an unknowing consumer.

In a similar effort to restrain the contents within a container by utilizing a disposable lid, U.S. Pat. No. 4,361,249 issued to Tuneski et al. discloses a lid which includes a cover section which snap fittingly engages the top rim of the container and which has an opening there through in a bottom section which is secured to the undersigned of the cover section and has a projection that extends through that opening. This lid is essentially a two-piece lid which as is readily apparent from the disclosure, would add considerably to the costs associated with the manufacture of such container. Furthermore, this container lid suffers from the same shortcomings as discussed hereinabove. That is, while the lid configuration set forth by Tuneski et al. discloses a drinking opening which is generally in a closed position when the contents of the container are being consumed by the consumer, this reference clearly fails to disclose or suggest any mechanism for indicating to the consumer whether the lid has been properly positioned on the container. Should the lid of Tuneski et al. become dislodged due to improper positioning of the lid on the container or excessive pressure being applied to the side walls of the container by the consumer, the lid would become at least partially dislodged resulting in spillage of the contents between the container and lid itself, which as noted hereinabove could seriously injure an unknowing consumer.

As with the above-noted references, U.S. Pat. No. 4,767,019 issued to Horner discloses a splash and spill resistant cup lid having a rim structure adapted to engage a lip around the mouth of a drinking container in a substantially leak proof manner comprising a canopy extending from the rim structure forming a shallow reservoir sized to fit into the mouth of the container and a vertical opening in the canopy which deflects liquid from splashing but permits metered flow of the beverage for convenient consumption by the consumer. In positioning the lid on the container, the rim portion is manufactured at a slight angle for a press fit engagement with the interior wall of the cup thereby forming a sufficient seal between an inner sidewall of the container and the container lid. However, if this lid is not properly positioned on the container or becomes dislodged due to pressure applied by the consumer holding the container, contents can readily spill from between the lid and the container thus injuring an unsuspecting consumer. As with each of the above-noted references, there is nothing in any of the above-noted lid configurations which indicates to the consumer whether or not it has been properly positioned on the container. Further, there is nothing in the above-noted lid configurations which indicates to the consumer that the lid is in the process of becoming dislodged. Accordingly, there is clearly a need in the prior art for a simple indication mechanism which would alert the consumer as to the position of the lid with respect to the container.

In unrelated arts, the need for seal indication of a package or container has been recognized. Particularly, U.S. Pat. No. 5,427,266 issued to Yun discloses a lid which includes a seal indication window for viewing a corresponding seal indication surface on the rim of a container. This provides a quick visual indication of whether the container is closed properly. Specifically, this lid and container construction is utilized for plastic food storage containers which includes a lid that snaps or slips on to the container by applying pressure. In order to ensure freshness of the contents of the container, windows are provided about an outer periphery of the container lid which permits the consumer to visually inspect the position of the lid with respect to the container to ensure that the lid/container combination is properly closed and sealed. However, such a construction is not practical for use in disposable lid configurations. Particularly, as noted hereinabove, this lid and container construction is not for use in connection with a one time use disposable container but for a container for multiple uses. The windows provided about the outer periphery of the container are of a different material or at least different optical characteristics resulting in a variation in light transfer than that of the remaining portion of the lid structure which adds considerably to the cost of manufacturing such lids and would clearly be cost prohibitive in a disposable lid context.

Accordingly, there is clearly a need in the art for a disposable lid for a disposable drinking container wherein the lid includes a mechanism for alerting the consumer as to the positioning of the lid with respect to the container. Such an indicating mechanism would protect the consumer from inadvertent spillage of the contents of the container due to the lid not being properly positioned on the container and would limit, if not eliminate, liability on the part of the establishment which uses the consumer related products. The combination thus offers the consumer a visual means of confirming engagement where prior art mechanisms, either tactile and/or aural sound are either inconclusive or subjective and therefore may lead to failure.

SUMMARY OF THE INVENTION

A primary object of the present invention is to overcome the aforementioned shortcomings associated with the prior art lid configurations.

That is, a particular object of the present invention is to provide a cost effective mechanism for indicating to the consumer the positioning of a disposable lid with respect to a container.

A still further object of the present invention is to provide a mechanism for protecting the consumer against spillage of the contents of a container.

Yet another object of the present invention is to provide a container having an indicating mechanism which is readily viewed by the consumer at various orientations so that the consumer is offered a visual means of continuing engagement.

A still further object of the present invention is to provide an indicating mechanism about at least select portions of a periphery of the container lid in order to indicate to the consumer that all portions of the lid are properly positioned with respect to the container.

These, as well as additional objects of the present invention are achieved by providing a lid for a container including a closure surface, a circumferential rim extending about a periphery of the closure surface with the rim including an outer side wall, an inner side wall and a transition wall interconnecting the outer side wall and the inner side wall with the closure surface extending from the inner side wall and at least one cut out formed in at least one of the inner side wall, the outer side wall and the transition wall such that a portion of a brim of the container is visible through the cut out when the lid is properly positioned on the container. Alternatively, a lid and container combination can be provided with the combination including a container having a bottom wall and an upstanding side wall extending from the bottom wall, the upstanding side wall including a brim extending about an upper periphery of the side wall with at least a portion of said brim having a first color pigment and a lid formed of at least one of a transparent and translucent material, the lid including a closure surface and a rim extending about a periphery of the closure surface for engaging the brim of the container, at least a portion of the rim of the lid having a second color pigment such that when the lid and container are combined by inserting the brim of the container into the rim of the lid, the first color pigment of the container and the second color pigment of the lid combine to form a third color pigment visible from an outer surface of the rim.

The foregoing objects as well as others present invention will become apparent from the following detailed description of the present invention when read in light of the several figures.

BRIEF DESCRIPTION OF THE DRAWINGS

FIG. 1 is a perspective view of a cup or a beverage container having a cup lid in accordance with the present invention shown in a position for attachment of the lid thereto.

FIG. 2 is a plan view of the container lid illustrated in FIG. 1.

FIG. 3, is an elevational view of a beverage container having a lid positioned thereon in accordance with the present invention.

FIG. 7 is a perspective view of a cup or a beverage container having a cup lip in accordance with an alternative embodiment of the present invention positioned for attachment hereto.

FIG. 8 is an elevational view of the lid in accordance with the alternative embodiment of the present invention in position for attachment to the container.

FIG. 9 is an elevational view of a lid in accordance with the alternative embodiment of the present invention in position on the container.

DETAILED DESCRIPTION OF THE PRESENT INVENTION

Figure 4:
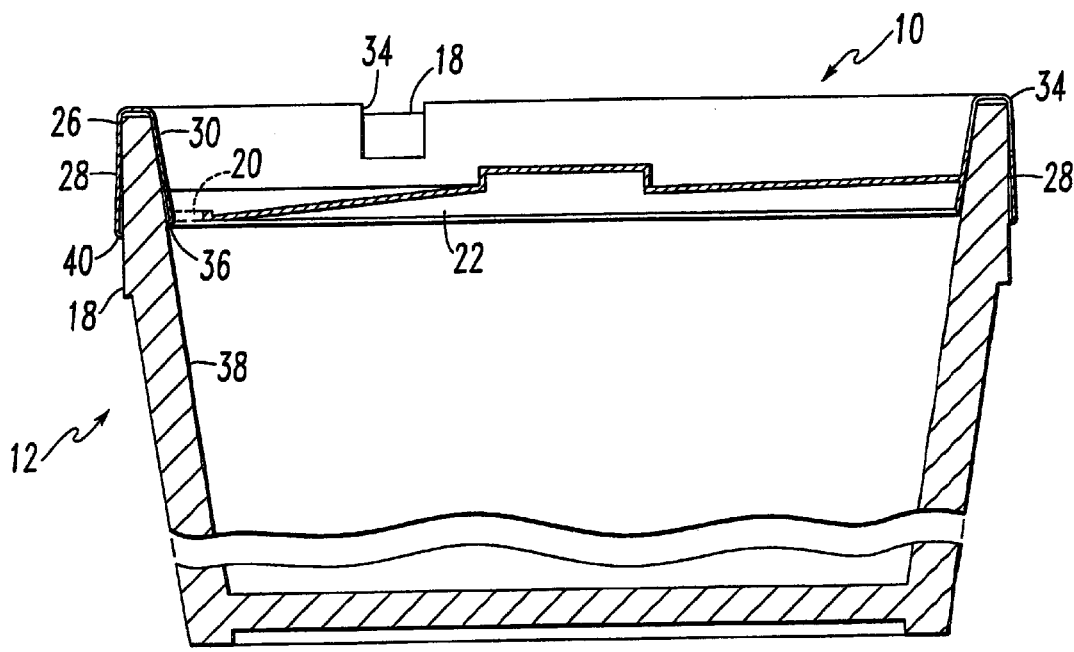
FIG. 4 is a cross-sectional view of a container lid in accordance with the present invention positioned on the container taken along lines IV—IV of FIG. 2.

With reference now to the several figures, and particularly FIGS. 1–5, an initial embodiment of the present invention will be described in detail.

Illustrated in FIG. 1 is a disposable lid 10 incorporating the details of an initial embodiment of the present invention. Such a lid is adapted to be secured about an upper periphery of a container 12 as illustrated therein. The container 12 may be of any conventional type beverage container that includes truncated side walls 14, a bottom wall 16 and a rim region 18. It is the rim region which is readily adapted to receive the disposable lid 10. It should be noted that the container 12 may take on any configuration and may be formed of any known type of material including, but not limited to, styrofoam, paperboard or a thermal settable plastic material. Particularly, the upper perimeter of the container 12 may take on numerous configurations any may include a molded brim when material such as styrofoam and thermal settable plastic material are used or a rolled brim when materials such as paperboard or a thermal settable plastic material are used. Regardless of the particular configuration of the brim region 18, the container lid 10 would be manufactured in accordance with the specifications of the brim 18 so as to form a proper seal therebetween.

As to the lid 10, this lid may take on numerous configurations and include numerous additional features without departing from the particular spirit and scope of the present invention. That is, the liquid opening 20 and overflow accumulation through 22 may take on any configuration. Moreover, the upper substantially planar surface 24 of the lid may include a domed region while coinciding with the present invention. The lid 10 includes a rim region 26 which accommodates the brim 18 of the container 12 in a conventional manner. The rim 26 includes an outer side wall 28, an inner side wall 30 as well as a transitional upper extremity 32. Mutually spaced about the rim 26 are cutouts 34. These cutouts may take on numerous configurations so long as their purpose, which will be discussed in greater detail herein below, is satisfied. Furthermore, while FIG. 1 illustrates the lid 10 as including four such cutouts, any number of cutouts may be utilized again so long as the purpose for which the cutouts are intended is satisfied.

With reference to FIG. 2, the spacial relationship of the cutouts 34 to one another is illustrated. In this regard, four cutouts are illustrated with respective pairs of the cutouts being diametrically opposed from one another. As will become apparent from further reading of the detailed description, this allows for accurate viewing of the brim 18 of the cup 12 over each quadrant of the container lid 10. As noted hereinabove, the lid 10 includes a triangular shaped drain trough which slopes downwardly toward the opening 20. As with conventional lid configurations, this trough allows any spillage or left over beverage after consumption to drain back into the container through the opening 20. Again, this particular feature of the present invention may take on numerous configurations so long as the consumer can gain read access to the contents of the container by way of a suitable opening.

With reference now to FIGS. 3 and 4, it can be seen that the lid configuration 10 forms a plug fit with respect to the brim 18 of the container. That is, the inner side walls 30 of the rim 26 of the lid 10 includes a lower most peripheral pressure point 36 wherein a liquid tight seal is formed between the lid 10 and an inner surface 38 of the container 12. The particular significance of this plug fit configuration will become apparent to those skilled in the art herein below. Additional sealing can take place between the rim 26 of the lid 10 and the brim 18 of the container 12. A peripheral pressure contact point such as the contact point 40 illustrated therein provides for the secure positioning of the lid 10 with respect to the container 12. As is clearly illustrated in FIG. 4, when the container lid is properly positioned about an upper periphery of the container 12 and secured thereto, the consumer can readily visually inspect such a position by way of the cutouts 34. That is, as is clearly illustrated in FIGS. 3 and 4, the brim 18 of the container 12 is readily visible through the cutouts 34 formed in the lid 10 thus allowing the salesperson to visually inspect the container to insure that the lid 10 is properly positioned on the container 12 and also allow the consumer to confirm that the lid has initially been properly positioned with respect to the container and also permit the consumer to be readily alerted should the lid 10 become displaced with respect to the container 12. Also, because the seal between the container 12 and lid 10 is below the cutouts, no liquid can escape through the cutouts. Clearly, this visual indicator allows for the consumer to readily inspect the container in order to ascertain whether the lid has been properly positioned with respect to the container. Furthermore, this allows the salesperson to insure that the lid is properly positioned with respect to the container prior to giving the container having potentially harmful contents therein to the consumer. Clearly, such an indication mechanism could limit the liability of the vending establishment by taking all practical measures in order to insure that the lid is properly positioned with respect to the container when the container is given to the consumer. Moreover, it provides the consumer with a mechanism to readily identify whether the lid is properly positioned and to readily identify whether the lid remains in the proper position during consumption of the contents. As noted hereinabove, regardless of the configuration of the lid, one significant aspect of the present invention is the fact that the liquid-tight seal is maintained in an area between an inner surface 38 of the container and the lid at a position between the cutout 34 formed in the lid and the contents of the container. This insures that no contents of the container will inadvertently seep out through the cutouts 34 once the lid is properly positioned with respect to the container.

Figure 5:
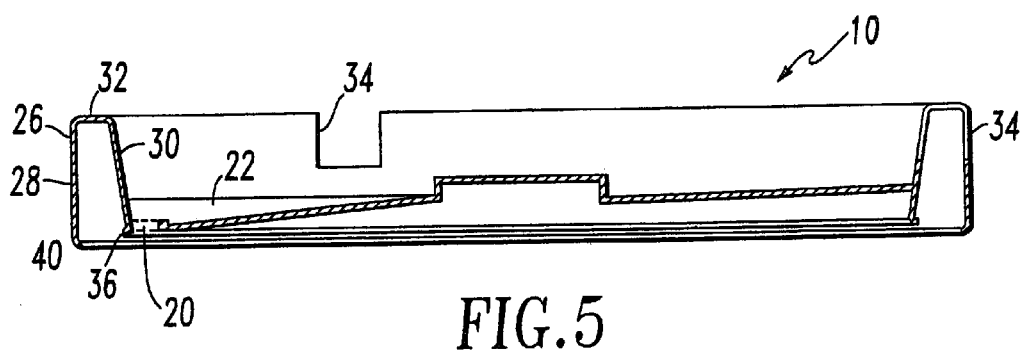
FIG. 5 is a cross-sectional view of only the lid in accordance with the present invention taken along lines IV—IV of FIG. 2.

Illustrated in FIG. 5 is a detailed cross-sectional view of the lid 10 without the presence of the container 12. As noted hereinabove, the lid 10 includes an opening formed therein which may take on numerous configurations. Leading to the opening 20 is a trough region or drain region 22 which permits liquid which may splash out of the opening 20 or be left over after consumption of the contents to drain back into the container. Additionally, as noted hereinabove, the lid 10 includes a rim 26 having an outer side wall 28, an inner side wall 30 and transition region 32. Additionally, formed in the rim 26 are cutouts 34. The significance of which is set forth in detail hereinabove. Again, as noted hereinabove, any number, size and configuration of the cut outs may be included so long as the visual inspection of the lid with respect to the container is readily apparent and the overall structural integrity is maintained.

Figure 6:
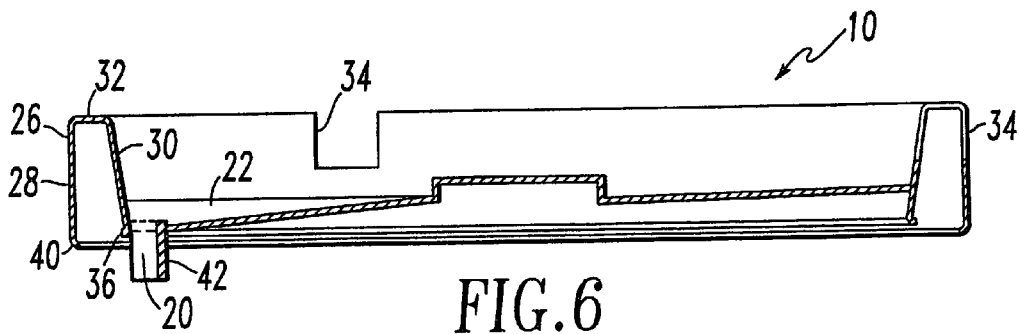
FIG. 6 is an alternative embodiment of the lid in accordance with the present invention

FIG. 6 illustrates an alternative embodiment to that illustrated in FIG. 5 and includes all of the features noted with respect to FIG. 5. Additionally, FIG. 6 illustrates a shield 42 which holds back any non liquid contents of the container during consumption of the contents by the consumer. That is, should ice, fruit or other solid type objects be included in the contents of the container, the shield 42 will prevent such contents from clogging the opening 20 and restricting access to the contents by the consumer. Additionally, the lid configuration illustrated herein may include straw slots and any other conventionally known structural components.

With reference to FIGS. 7, 8 and 9, an alternative embodiment of the present invention will now be described in detail herein below.

As with the previous embodiments, a container 112 may take on any configuration and include any type of brim configuration 118. The container 112 includes a sidewall 114 and bottom wall 116 in addition to the brim 118.

Similar to the previous embodiment, the lid 110 may take on any known configuration. However, in this instance, the lid must be formed of a plastic translucent or transparent material. The lid may include any type of conventional opening formed therein without departing from the spirt and scope of the present invention. As illustrated in FIG. 7, the lid includes a brim 126 having an outer sidewall 128 and an inner sidewall 130 with the inner and outer sidewalls connected to one another by way of a transition region 132. Once again, the lid 110 and container 112 may take on any configuration so long as the principle set forth herein below with respect to the present invention and be sustained.

With reference now to FIGS. 8 and 9, at least the brim 118 of the container 112 is colored in a conventional manner with any one of several colors. Particularly, it is preferred that the brim 118 be colored with a primary color. Additionally, the thermal plastic lid 110 is also colored in a known manner with a color complimentary to the color of the brim 118 and preferably with a primary color complimentary to the color of the brim 118. The brim coloration is illustrated by the substantially vertical lines 150 while the lid coloration is illustrated by the substantially horizontal line2 152. It is noted that it is only essential that the rim region 126 of the lid 110 be colored, however, in order to expedite manufacture of the lids 110, the entire lid may be of an identical color. With respect to the colors chosen for each of the rim 18 and lid 110, it is preferred that the colors chosen by primary colors and that the color 150 of the brim 118 be of a darker shade than the primary color 152 of the lid 110. Again, it is essential that the lid 110 be formed by a transparent or translucent material.

With reference now specifically to FIG. 9, the lid 110 is positioned over the brim 118 of the container 112 and proper positioning of the lid 110 with respect to the container 112 results in a change in the visual color appearance of the rim region 126 of the lid 110. This change in visual coloration is illustrated by the substantially diagonal lines 154. It is noted that this concept is quite similar to that which has been used in the past for interlocking closure strips from plastic bags as illustrated in U.S. Pat. No. 4,907,321 and others. Preferably, the color combinations chosen for the present invention would be as follows.

A blue rim 118 and a yellow brim 126 resulting in a closure indication of green, a red rim 118 and a yellow brim 126 resulting in a closure indication of orange or a blue 118 rim and a red brim 126 resulting in an closure indication of purple.

Once the lid is properly positioned about an upper periphery of the container 112, the salesperson and consumer can readily visually inspect the combination so as to insure that the changed color is readily apparent about an entire periphery of the container. This occurs, when the lid 110 properly contacts the container 112.

Accordingly, as can be seen from the foregoing, mechanisms for insuring the proper positioning of a disposable container lid with respect to a container containing a beverage are readily achieved with no additional costs or only a minimal cost increase with respect to the lid and container, if any. In accordance with the foregoing, the sales person and consumer can readily visually inspect the container in order to ascertain whether or not the lid is initially properly positioned with respect to the container. Moreover, this permits the consumer to be readily alerted should the lid become partially dislodged from the container which is not possible with the prior art.

While the present invention has been described with reference to preferred embodiments, it should be appreciated by those skilled in the art that the invention may be practiced otherwise than as specifically described herein without departing from the spirt and scope of the invention. It is, therefore, to be understood that the spirit and scope of the invention be limited only by the appending claims.

What is claimed is:

1. A lid for a container, comprising:
   a closure surface;
   a circumferential rim extending about a periphery of said closure surface, said rim including an outer side wall, an inner side wall and a transition wall, said transition wall interconnecting said outer side wall and said inner side wall forming a void for receiving a portion of the container therein with said closure surface extending from said inner side wall;
   at least by cut outs formed in at least one of said outer side wall, said inner side wall and said transition wall;
   a sealing means formed in said inner side wall of said circumferential rim for forming a seal with the container between said cut outs and contents of the container; and
   a drink through opening formed in at least a portion of said closure surface for permitting access to contents of the container;
   wherein at least a portion of a brim of the container is visible through each of said cut outs when the lid is positioned an the container.

2. The lid as defined in claim 1, wherein said cut outs are mutually spaced about said circumferential rim of the lid.

3. The lid as defined in claim 1, wherein said cut outs are formed in said inner side wall and said transitional wall of said rim.

4. The lid as defined in claim 1, wherein said cut outs are formed in said outer side wall and said transitional wall of said rim of the lid.

5. The lid as defined in claim 1, wherein said cut outs are formed in said outer side wall, said transitional wall and said inner side wall of said rim of the lid.

6. The lid as defined in claim 2, wherein there are two diametrically opposed pairs of cut outs formed in said circumferential rim of the lid.

7. A disposable lid and container combination, the combination comprising:
   a container having a bottom wall and upstanding side wall extending from said bottom wall, said upstanding side wall including a brim extending about an upper periphery of said side wall; and
   a lid having a closure surface and a circumferential rim extending about a periphery of said closure surface, said rim including an outer side wall, an inner side wall and a transition wall interconnecting said outer side wall and said inner side wall thereby forming a space between said outer side wall and said inner side wall for receiving said brim of said container, at least three cut outs formed in at least one of said outer side wall, said inner side wall and said transition wall, a seal formed in said inner side wall adjacent said cut outs and a drink through opening formed in at least said closure surface;
   wherein portions of said brim of said container are visible through said cut outs when said lid is positioned on said container such that an actual position of said lid with respect to said container is capable of being determined.

8. The combination as defined in claim 7, wherein said cut outs are mutually spaced about said circumferential rim of the lid.

9. The combination as defined in claim 7, wherein said cut outs are formed in said inner side wall and said transitional wall of said rim.

10. The combination as defined in claim 7, wherein said cut outs are formed in said outer side wall and said transitional wall of said rim of the lid.

11. The combination as defined in claim 7, wherein said cut outs are formed in said outer side wall, said transitional wall and said inner side wall of said rim of the lid.

12. The combination as defined in clam 8, wherein there are two diametrically opposed pairs of cut outs formed in said circumferential rim of the lid.

13. The combination as defined in claim 7, wherein said lid and said container are of contrasting colors.

14. The lid as defined in claim 1, wherein said cutouts are formed in said transition wall of said rim of said lid.

15. The lid as defined in claim 7, wherein said cut outs are formed in said transition wall of said rim of said lid.

* * * * *